US012770180B1

(12) United States Patent
Srikanth et al.

(10) Patent No.: US 12,770,180 B1
(45) Date of Patent: Oct. 20, 2026

(54) SYSTEMS AND METHODS FOR ENHANCING CONTENT AND THE RENDERING OF CONTENT

(71) Applicant: ProrataAI, Inc., Pasadena, CA (US)

(72) Inventors: Munirathnam Srikanth, Sammamish, WA (US); Yi Liu, Bellevue, WA (US); Tarek Najm, Bellevue, WA (US); Ian Ferreira, Austin, TX (US); William Tod Gross, Pasadena, CA (US)

(73) Assignee: ProrataAI, Inc., Pasadena, CA (US)

( * ) Notice: Subject to any disclaimer, the term of this patent is extended or adjusted under 35 U.S.C. 154(b) by 0 days.

(21) Appl. No.: 19/355,957

(22) Filed: Oct. 10, 2025

(51) Int. Cl.
*G06Q 30/0601* (2023.01)
*G06F 16/9535* (2019.01)
*G06Q 30/0251* (2023.01)

(52) U.S. Cl.
CPC ... *G06Q 30/06314* (2025.08); *G06F 16/9535* (2019.01); *G06Q 30/0255* (2013.01); *G06Q 30/0627* (2013.01)

(58) Field of Classification Search
CPC ......... G06Q 30/06314; G06Q 30/0255; G06Q 30/0627; G06F 16/9535
See application file for complete search history.

(56) References Cited

U.S. PATENT DOCUMENTS 7,698,170 B1 * 4/2010 Darr ....................... G06Q 30/02 705/26.35
9,607,105 B1 3/2017 Backenstoes et al.
9,881,088 B1 * 1/2018 Leber .................. G06F 16/3329
10,970,742 B1 4/2021 Knijnik
11,574,403 B2 2/2023 Ngo Dinh
11,947,923 B1 4/2024 Jain
12,211,598 B1 1/2025 Aravamudan
(Continued)

FOREIGN PATENT DOCUMENTS

WO WO 2025 170579 A1 8/2025

OTHER PUBLICATIONS

Liwen Zheng et al. "Fact in Fragments: Deconstructing Complex Claims via LLM-based Atomic Fact Extraction and Verification", Jun. 9, 2025, pp. 1-32 (Year: 2025).*
(Continued)

*Primary Examiner* — Jared M Bibbee
(74) *Attorney, Agent, or Firm* — Knobbe, Martens, Olson & Bear LLP

(57) ABSTRACT

Methods and systems are described configured to generate and distribute content over a network and cause the content to be rendered on one or more devices. A computer system may comprise a processing device comprising one or more arrays of tensor cores, matrix multipliers, and/or SIMD (Single Instruction, Multiple Data) units. The processing device may comprise a dataflow or systolic array architecture. The computer system receives and segments text. Claims may be extracted and may be determined to be conclusion or premise claims. A graph structure may be generated reflecting the relationship between the claims. A characteristic of respective claims may be determined. Using the characteristic, a determination may be made as to whether additional content is to be rendered in association with a given claim. In response to such a determination, additional content may be caused to be rendered on a device adjacent to the given claim.

21 Claims, 6 Drawing Sheets

(56) References Cited

U.S. PATENT DOCUMENTS

| | | | |
|---|---|---|---|
| 2015/0073904 | A1 | 3/2015 | Pan |
| 2016/0300135 | A1 | 10/2016 | Moudy |
| 2019/0258715 | A1 | 8/2019 | Hellman et al. |
| 2020/0065619 | A1 | 2/2020 | Liu |
| 2020/0285959 | A1 | 9/2020 | Liu et al. |
| 2020/0286146 | A1 * | 9/2020 | Song ................... G06F 16/9024 |
| 2020/0311558 | A1 | 10/2020 | Tan et al. |
| 2020/0311800 | A1 | 10/2020 | Srinivas et al. |
| 2020/0334493 | A1 | 10/2020 | Wu et al. |
| 2020/0372243 | A1 | 11/2020 | Tai et al. |
| 2021/0064987 | A1 | 3/2021 | Springer et al. |
| 2021/0133507 | A1 | 5/2021 | Dinh et al. |
| 2021/0209311 | A1 | 7/2021 | Liu et al. |
| 2021/0224993 | A1 | 7/2021 | Tian |
| 2021/0287277 | A1 | 9/2021 | Srinivasan et al. |
| 2021/0312697 | A1 | 10/2021 | Maiyuran et al. |
| 2022/0083807 | A1 | 3/2022 | Zhang et al. |
| 2022/0197961 | A1 | 6/2022 | Baek |
| 2023/0070038 | A1 * | 3/2023 | Witte .................. G06F 11/0772 |
| 2024/0152696 | A1 | 5/2024 | Anand |
| 2024/0249318 | A1 | 7/2024 | Spiegel |
| 2024/0256845 | A1 | 8/2024 | Nurvitadhi et al. |
| 2024/0273291 | A1 | 8/2024 | Smith |
| 2024/0273369 | A1 | 8/2024 | Song |
| 2024/0303496 | A1 | 9/2024 | Nair |
| 2024/0320310 | A1 | 9/2024 | Callegari |
| 2024/0354436 | A1 | 10/2024 | Mukherjee |
| 2024/0404514 | A1 | 12/2024 | Rollwage |
| 2025/0005434 | A1 | 1/2025 | Peng |
| 2025/0021820 | A1 | 1/2025 | Doggett |
| 2025/0061266 | A1 | 2/2025 | Jin |
| 2025/0061291 | A1 | 2/2025 | Gardner |
| 2025/0061491 | A1 | 2/2025 | Ahmad-Taylor |
| 2025/0068833 | A1 | 2/2025 | Wong |
| 2025/0156641 | A1 | 5/2025 | Tang |
| 2025/0225400 | A1 | 7/2025 | Gross et al. |
| 2025/0225402 | A1 | 7/2025 | Gross et al. |
| 2025/0307871 | A1 | 10/2025 | Wang |
| 2025/0335521 | A1 * | 10/2025 | Tenneti ............... G06F 16/9532 |
| 2026/0087057 | A1 | 3/2026 | Rahman |
| 2026/0099866 | A1 | 4/2026 | Brown |

OTHER PUBLICATIONS

Linyao Yang et al., "Give us the Facts: Enhancing Large Language Models With Knowledge Graphs for Fact-Aware Language Modeling", IEEE, vol. 36, No. 7, Jul. 2024 (Year: 2024).*

International Search Report and Written Opinion dated Apr. 19, 2025, received in International Patent Application No. PCT/US2025/010309, in 11 pages.

International Search Report and Written Opinion dated Apr. 24, 2025, received in International Patent Application No. PCT/US2024/062390, in 14 pages.

Hao, Yaru, et al. "Self-attention attribution: Interpreting information interactions inside transformer." Proceedings of the AAAI Conference on Artificial Intelligence. vol. 35. No. 14. 2021. (Year: 2021).

Schuurman, Derek C. "Step-by-step design and simulation of a simple CPU architecture." Proceeding of the 44th ACM technical symposium on Computer science education. 2013. (Year: 2013).

Shaar, Shaden, et al. "Assisting the human fact-checkers: Detecting all previously fact-checked claims in a document." Findings of the Association for Computational Linguistics: EMNLP 2022. 2022. (Year: 2022).

Yu, Yueyao, and Yin Zhang. "Why"classic" Transformers are shallow and how to make them go deep." arXiv preprint arXiv: 2312.06182 (2023). (Year: 2023).

* cited by examiner

SYSTEMS AND METHODS FOR ENHANCING CONTENT AND THE RENDERING OF CONTENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field of the Invention

The present disclosure relates to the distribution content over a network, and in particular to providing enhanced, augmented content over a network.

Description of the Related Art

The access and delivery of content over a network has become an increasingly vital method of distributing information data. However, given the vast amount of data it has become increasingly technically challenging for search engines and the like to find data relevant to a user query. The foregoing technical challenges have been exacerbated with the vast increase in generative model-created content.

Thus, it would be technically advantageous to efficiently identify content relevant to a user query or relevant to other data accessed by a user.

BRIEF DESCRIPTION OF THE DRAWINGS

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Figure 1:
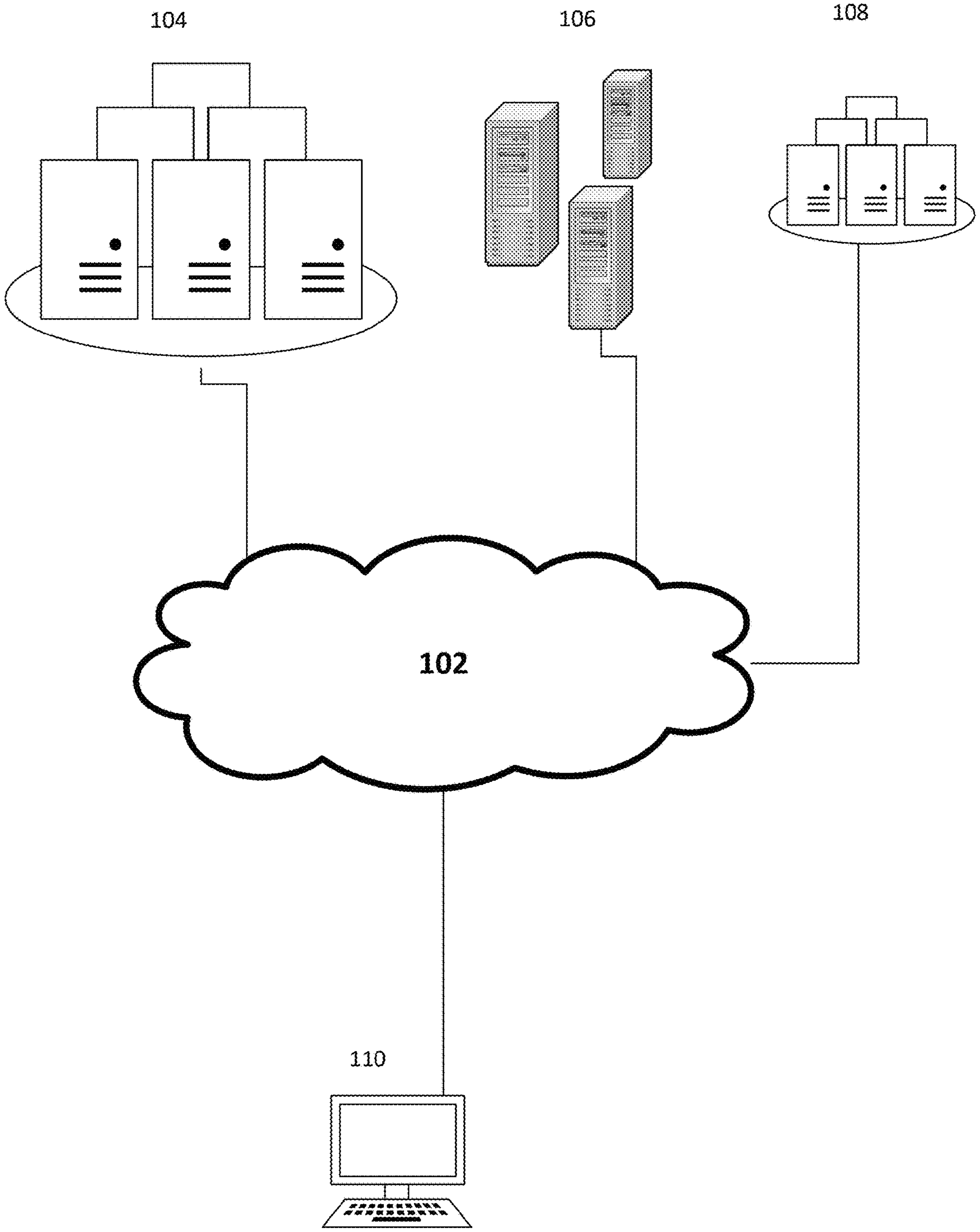
FIG. 1 illustrates an example networked environment.

As similarly discussed elsewhere herein, the access and delivery of content over a network has become an increasingly vital method of distributing information data. However, given the vast amount of data, it has become increasingly technically challenging for search engines and the like to find data relevant to a user query. The foregoing technical challenges have been exacerbated with the vast increase in generative model-created content.

Thus, it would be technically advantageous to efficiently identify content relevant to a user query or prompt or relevant to other data accessed by a user. For example, large language models (LLMs) and other generative models are becoming an increasingly important technology in content and information production. Large language models may be configured to perform a variety of language tasks, such as providing answers to user prompts/questions, summarizing information, generating human-like text, performing text translations, writing scripts and stories, generating still or video images, generating audio, and/or the like. LLMs may thus be utilized in many different types of applications, such as chatbots, language processing, and content creation.

A large language model or other artificial intelligence model may generate some or all of the foregoing content in response to a user prompt, such as a query. An aspect of the present disclosure relates to selecting and/or generating ancillary content in real time to present in conjunction with the content generated by the large language model, thereby providing enhanced information to the user. This reduces the need to run multiple iterations of prompts in order to obtain such enhanced content, and hence greatly reduces the processing resources and energy that would otherwise be needed to respond to such prompt iterations. Further, the foregoing approach provides a user with helpful relevant content with high efficiency.

As will be described in greater detail herein, an aspect of the present disclosure relates to a process for identifying and/or generating content to be rendered in conjunction with other content, such as the content generated by an AI model. For example, a user prompt (e.g., a query) may be received by an AI model. The AI model may generate a corresponding output, which may be in the form of a full-text natural language answer. The output may be parsed into discrete semantic claims using another model, such as a large or small language model. The claims may be organized into a graph structure. The graph structure may be utilized to identify central claims (e.g., corresponding to a first number of most connected nodes). The central claims (and optionally non-central claims) may be scored based on one or more criteria (e.g., based on key concepts, words, applicability to third party content such as advertisements, etc.).

Scored claims may be matched against third party content, such as against product catalogs (a data store, such as a database, of data regarding a variety of products and/or product types, where the catalog may include product), using semantic similarity and entity matching. For example, the text from product catalogs may be cleaned and normalized, wherein text is converted to lowercase text, punctuation and/or special characters are removed, and tokenization lemmatization, and/or stop word removal may be performed.

A named entity recognition model (NER) model, based on BERT or other models, may be utilized to extract key entities from the claim (e.g., brand names, product types, specifications, etc.). Similarly, an NER model may be utilized to identify product-related data such as features, quantity, size, technology, materials, cost, etc.

A semantic embedding model may be utilized to convert respective claims into corresponding embedding vectors and convert catalog data for respective products in the catalog into corresponding embedding vectors (e.g., name, description, specifications, cost, etc.). Optionally, domain-specific embeddings and/or domain specific models may be utilized (e.g., automotive, travel, fashion, electronics, etc.).

Semantic similarity matching may be performed between the claim embeddings and one or more of the product embeddings (e.g., by computing the cosine similarity between the claim embeddings and a given product embedding, where the higher the computer similarity the better the match). The catalog products may be ranked by similarity score. Optionally, a threshold may be set (e.g., cosine similarity greater than 0.66, 0.75, or other threshold) to keep only high-confidence matches, wherein matches that fail to satisfy the threshold may be discarded (e.g., deleted from memory or overwritten) to reduce memory utilization.

The following is an example claim and an example match:

Claim="Four wheel drive, EV SUVs"

Match with catalog product: "ACME, all wheel drive, SUV . . . "

Optionally, rule-based and/or ML-based entity matching on claims and product attributes may be performed (e.g., brand, model, specifications (e.g., horsepower, range, drive-type, etc.)) and scored.

Optionally, a hybrid approach may be utilized comprising generating and using a semantic similarity score (text-level meaning), entity match score (attribute-level match), and/or relation match score, where the semantic similarity score and entity match score may be weighted differently.

Optionally, once a matching product has been identified (e.g., the closest matching product), corresponding content (e.g., an ad for the product, other third party content related to the product, etc.) may be selected and rendered in close visual proximity with the corresponding claim (e.g., to the side of the claim, such as just below, above, to the left, or to the right of the claim, or where the claim text surrounds some or all of the selected content). Thus, the most or more relevant content (e.g., third party content) may be selected to be displayed in close proximity with the corresponding claim so that it is easy for the user to understand that the selected content is related to the claim and so it is convenient for the user to read/view the selected content after reading the claim.

Optionally, lead-in content (e.g., text, audio. And/or video) may be generated using a generative model, wherein the lead-in content connects the claim to the selected content and provides context for the display of the selected content in conjunction with the claim. The lead-in content may be delivered to the user device with the selected content for rendering. The lead-in content may be generated by the generative model in response to a prompt fed into the model, requesting that the model provide lead-in content that relates to both the claim and the selected content.

Optionally, as similarly discussed elsewhere herein, a graph may be utilized in determining an importance characteristic, function, and/or relationships between claims. Thus, an aspect of the present disclosure relates to systems and methods for decomposing content, such AI-generated answers into discrete semantic claims, organizing such claims into a structure, such as graph of meanings, and identifying graph points corresponding to points of interest wherein third party may want to place content in association with the claim(s).

The claims may be classified into different categories to enable content generation for different scenarios. For example, classifying claims to be 'advertisable', may be utilized to identify the claims used as input to generate Ad text and/or lead-in text, such as that described elsewhere herein. Identifying 'incomplete' or 'non-precise' claims may be used in selecting sources or documents for which claims-may be generated, such as a claim-based one-line summary or citation which may be rendered in a user interface. Thus, the claims graph provides the organization to understand claims and their dependencies. These claims may also be classified under different categories for different purposes and such classifications may enhance the ability to generate appropriate content using a generative model.

Such third party content may then be optionally matched, ranked, and/or contextualized to add the content to the display of the AI-generated answers, to thereby enhance user experience while providing third party content providers (e.g., advertisers) with the opportunity to place their content in association with other relevant content provided to a user.

Such decomposition of the output of an AI model may be performed using one or more techniques, such as claim extraction, claim graph construction, and a search for third party content suitable for one or more of the claims in the AI-generated output.

Following are certain definitions to provide context to the present disclosure:

| | |
|---|---|
| Text | One or more of text characters, words, phrases, sentences, paragraphs, and/or the like (e.g., output by an AI model, an article, document, blog, and/or other text). |
| Text segmenting | The process of breaking a long piece of text into text segments (sometimes referred to as chunking) for ingestion (e.g., into paragraphs, sentences, phrases, or special dividers). |
| Text Segments | Output from the text segmenting process, wherein a given segment comprises a subset of the text (e.g., a small segment of text). |
| Claim Extraction | The process of extracting claims from text segments (e.g., performed using a language model that is trained from made data sources). |
| Claim set | The set of claims from the claim extraction process. |
| Conclusion Claim extraction. | The process of extracting conclusions from the text (e.g., performed by feeding the claims and text into a language model and instructing it to extract the conclusion claims). |
| Conclusion claims | Conclusion claims generated or identified by conclusion claim extraction. Conclusion claims are terminal claims that do not support subsequent claims. |
| Premise Claims | Claims that are not deemed as conclusion claims by the conclusion claim extraction process. Premises serve to support conclusions or other premises. |
| Claim-based BFS. | An example algorithm, breadth-first search (BFS), adapted for use in extracting claim graphs. |
| Claim Graph | A structural representation of the text using claims and graphs, wherein a node is a claim and an edge is a relationship. |
| Is the claim important? | An importance filter that examines and ranks the importance of a claim. For example, the filter may be configured to determine that claims that are close to the conclusions or have many connected edges are important claims. |
| Is the claim suitable for adding third party content? | A suitability filter configured to determine the suitability of one or more claims for the addition of third party content (examples of which are described herein). A trained language model may optionally be utilized to perform this task. |
| Third party content suitable claims | The output of the importance and suitability filters, wherein claims that are suitable for third party content (e.g., a specific type of third party content) are identified. |
| User Interest extraction. | User interest extracted from third party content suitable claims (e.g., where extraction may be performed using a trained language model). |
| Product Suggestion. | Product suggestions generated using the extracted user interest. A trained language model may optionally be utilized to perform this task. |
| IAB classification. | The third party content suitable claims may be classified (e.g., using the IAB classification of the third party content suitable claims or other |

-continued

| | |
|---|---|
| | classification mechanism) and they may be tagged (e.g., with potential demographic tags). A trained language model may optionally be utilized to perform this task. |
| Third party content finding. | Optionally, the third party content may be found in a catalogue. |
| Lead-in content. | Lead-in content (e.g., text) for third party content that may be automatically generated, optionally using a large language model. |

As similarly discussed above, a claim may comprise an atomic sentence (or a portion of a sentence), that is a proposition that cannot be decomposed into simpler logical components. Text to text segmenting may be performed to extract text segments, such as sentences. Then claim extraction may be performed on the text segments.

For example, the sentence "A new Pope named Leo XIV was elected on May 8, 2025 in the Sistine Chapel because Pope Francis died" may be decomposed into 5 atomic statements:

C1. A new Pope was elected.

C2. The new Pope is called Leo XIV.

C3. Pope Leo was elected on May 8, 2025.

C4. Pope Leo was elected in the Sistine Chapel.

C5. Pope Francis died.

Each of the foregoing statements is irreducible and thus constitutes a claim. Generally, it may be assumed that a given sentence may itself be a claim or can be decomposed into a set of claims. To implement such decomposition, the input may be segmented into individual sentences and then a given sentence may be deconstructed into atomic claims (e.g., using a language model).

For example, a language model may be trained to decompose a complex sentence by providing the language model with examples that demonstrate how to break down a sentence into its atomic facts. The decomposition process may optionally be dynamic and iterative, which may be particularly useful for complex claims. Thus, the language model may iteratively break down the original claim into smaller facts, potentially adjusting its approach based on previously extracted or verified facts.'

A claim may be a decontextualized claim comprising molecular facts that together represent the meaning expressed in the sentence, Thus, a decontextualized claim comprises a statement that is self-contained and verifiable on its own, without needing the original context in which it was made. The decontextualized claim is composed of "molecular facts," which are specific, verifiable units of information that are formed by combining "atomic" facts. A claim may be a denormalized claim representing a fully qualified statement whose meaning is contained in the sentence. Thus, a denormalized claim may comprise a structured, self-contained data record that fully captures the meaning of a single, declarative sentence.

For example, the decomposition process may optionally utilize Named Entity Recognition (NER) and Relation Extraction (RE) to identify entities (e.g., people, brands, product model names, places, organizations, etc.) and the relationships between them within the text. In addition or instead, Semantic Role Labeling (SRL) may be utilized to understand the roles played by different entities in an event or action described in the text (e.g., agent, patient, instrument). Fact extraction may be performed to extract factual statements, propositions, or assertions from the text as discrete units of meaning.

In a logically coherent response generated by an LLM, claims may be structured hierarchically as premises and conclusions. Premises serve to support either conclusions or other premises, while conclusions represent terminal claims (e.g., that do not support any subsequent claims). This hierarchical organization may be represented by a directed graph representation of claims, where nodes correspond to claims and directed edges encode the support relationships between them. Such a representation enables a transparent visualization of the logical structure underlying the LLM-generated response, facilitating both interpretability and formal reasoning over the model's output. Such directed graphs may be utilized to enhance machine learning models by providing structured, interconnected data that adds context and relationships to raw inputs. Such a directed graph may act as a source of domain-specific knowledge, enabling models to better understand ambiguous or sparse data. Thus, a claim graph enables models to incorporate relational features that are not present in raw data, such as the output of an LLM.

The construction of a claim graph establishes directed edges between claims in a coherent manner. However, formulating a rigorous and exhaustive definition for when an edge should exist between two claims is technically challenging and may consume inordinate amounts of processor bandwidth and memory. In order to reduce the complexity of determining when an edge should exist, a heuristic may optionally be utilized as follows: Claim A supports Claim B if and only if the truth of Claim A implies, or significantly contributes to the likelihood that Claim B is (or will be) true. This rule of thumb provides a sufficiently general criterion for inferring support relationships and guiding the construction of the directed edges in the claim graph. The foregoing example describes one type of relationship. While there is complexity in identifying claims as well as the relation between them, the 'supported by' relationship may be utilized for classifying premise and conclusion claims. There may be other relationships for different purposes. The example 'supported by' relationship is indicated as a heuristic to solve the broader classification problem.

To illustrate the foregoing technique, consider a set of claims describing the election of a new Pope in 2025:

C1. A new Pope was elected.

C2. The new Pope is called Leo XIV.

C3. Pope Leo was elected on May 8, 2025.

C4. Pope Leo was elected in the Sistine Chapel.

C5. Pope Francis died.

In this example, claims C2, C3, C4, and C5 each support C1 by providing complementary details concerning the who, when, where, and why of the election. Accordingly, directed edges may be drawn from C2, C3, C4, and C5 to C1 in the claim graph. This structure reflects that the truth of these premises collectively underpins the conclusion that a new Pope was elected.

Figure 5:
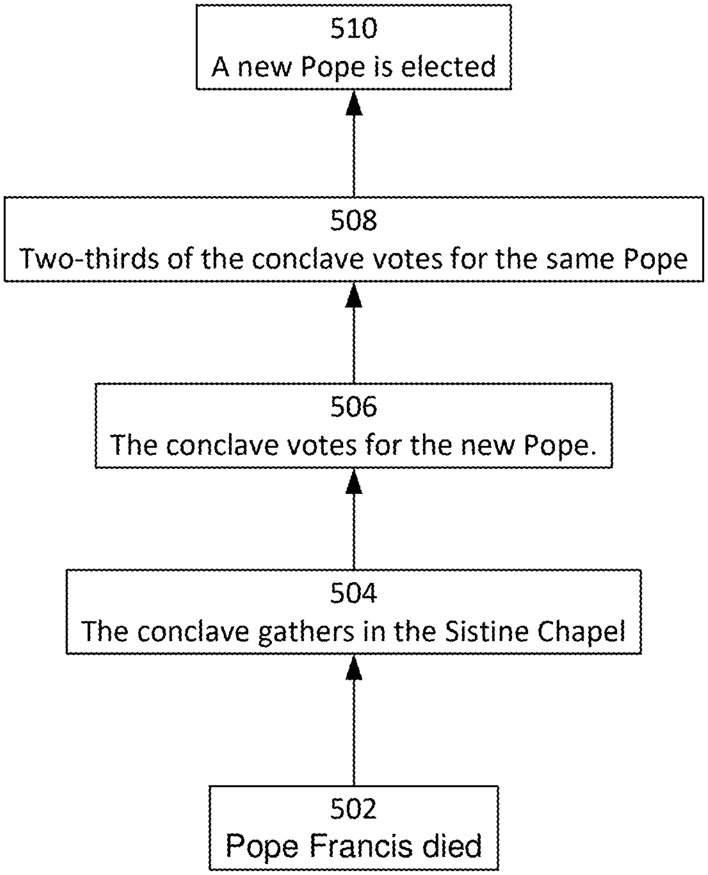
FIG. 5 illustrates an example claim graph.

Additionally, referring to FIG. 5, the claim graph may also reflect the underlying temporal structure of the events it describes. For example, a directed edge from Claim A to Claim B may indicate that B chronologically follows A, and that the occurrence of A is a prerequisite for B. By way of illustration, consider the following claims describing the process of electing a new Pope:

C5. Pope Francis died (502).

C6. The conclave gathers in the Sistine Chapel (504).

C7. The conclave votes for the new Pope (506).

C8. Two-thirds of the conclave votes for the same Pope (508).

C1. A new Pope is elected (510).

In this example sequence, C5 is the triggering event that eventually leads to C1. Drawing directed edges from C5 (502) to C6 (504), C6 (504) to C7 (506), C7 (506) to C8 (508), and finally C8 (508) to C1 (510) encodes this chronological progression. This temporal structure ensures that the resulting claim graph is both logically consistent and reflective of the order in which the events occur.

The construction of the claim graph is optionally carried out using an algorithm such as adapted breadth-first search (BFS) or the like. Conventional BFS is a graph traversal algorithm that conventionally explores all the vertices of a graph in breadth-first order. Thus, BFS explores all the vertices at the same level (the same distance from the source node) before moving to the next level.

While BFS is conventionally merely used for traversing existing graphs, an aspect of the present disclosure adapts its level-by-level exploration to actually construct a claim graph by starting with an initial claim and progressively adding related claims based on defined connections or relationships. The foregoing technique will now be described in greater detail.

As set forth in Algorithm 1 below and with reference to FIG. 4, conclusion claims are optionally first identified, as these tend to be more readily recognizable using natural language processing (which may be implemented using an LLM). Thus, it may advantageously require less computational resources (e.g., memory, processor, network, bandwidth) and enhance accuracy to first identify conclusion claims. In argumentative or expository writing, including but not limited to responses generated by LLMs, such conclusion claims are often expressed in topic sentences, which typically appear at either the beginning or end of a paragraph or essay. Hence, the location of a claim within textual expository writing may provide a quick indication and/or confirmation that a given claim is a conclusion claim, and further analysis as to whether a claim is a conclusion claim may be halted. The identified conclusion claims may then be placed into a "found claims" set and optionally labeled as conclusion claims.

Premise claims may be iteratively discovered claims that support the identified conclusion claims. Optionally, to reduce computer resource utilization, claims that support other premises rather than the conclusions themselves are ignored, and starting with the conclusion claims, the first set of premises are extracted that directly support the conclusion claims. The discovered premise claims may then be added to the found claims set and optionally labeled as premise claims.

Adapting and modifying the BFS paradigm, a conclusion claim is then selected from the found claims set and a search is conducted for its premises in the premise claims. To identify these supporting premises, a trained language model may be utilized that evaluates which claims provide direct support for the chosen claim. The foregoing process may be repeated until all (or a subset) of the claims are part of the claim graph. This corresponds to claim based BFS in FIG. 4, discussed in greater detail herein.

```
Algorithm 1.
Input: Text and Claims C1, C2, . . .
Initialize FoundClaimsSet={ } CheckedClaimsSet={ };
Identify conclusion claims (e.g. topic sentences)
Add conclusion claims to FoundClaimsSet;
While FoundClaimsSet is not empty;
    Access a claim C from FoundClaimsSet;
    Find premises P not in the FoundClaimsSet and
        CheckedClaimsSet that directly support C (e.g.,
        using a small language model);
    For Each p in P:
        Add directed edge (p to C) to G;
        Add p to FoundClaimsSet;
    Add C to CheckedClaimsSet
```

By analyzing the claim graph, the most important claims (e.g., the highest ranked n number of claims, wherein the ranking is based on the determined importance characteristic, or the claims whose determined importance satisfies an importance threshold) may be identified within the answer (e.g., generated by an LLM) to the user prompt. Important claims are often conclusion claims or premise claims that receive or provide substantial support to other claims, as indicated by a higher number of incoming or outgoing edges. Such claims are often more significant than other claims because they act as central, foundational statements upon which some or all of the remaining claims depend.

However, it is possible or likely that not all claims possess the same suitability for third part content placement (e.g., impressions) of a specific type (e.g., ads). Hence, the claims may be further classified or filtered based on their determined suitability for third party content placement. For example, the underlying user interests and/or pain points (e.g., specific problems or challenges that the user is experiencing or concerned with, such as things that cause user frustration, inefficiency, or difficulty) expressed in a given claim may be determined/inferred. By way of illustration, if a claim asserts that "range anxiety is the primary reason people are hesitant to buy EVs," then the associated customer interest pertains to long-range electric vehicles, and an opportunity to place content (e.g., third party content) may involve recommending specific electric vehicles equipped with extended battery capacity, where the recommendation may include the placement of third party content providing information regarding such electric vehicles equipped with extended battery capacity. The filtering process may utilize a trained language model, custom encoding and/or deep-learning model, that inputs the important claims, identifies those most suitable for placement of third party content related to the corresponding claims, and optionally simultaneously extracts the corresponding user interests and/or product recommendations.

The claims suitable for third party content, user interests, and/or recommended products may optionally be fed into a third party content search engine, optionally with other filters such as Interactive Advertising Bureau (IAB) classifications (where third party content may be associated with corresponding IAB tags), content, and/or audience tags (e.g., tags used to identify and organize different segments of an audience based on specific characteristics, behaviors, and/or interests), which may identify suitable content. Optionally, one or more trained language models may be used to identify or assign IAB, content, and/or audience tags. As similarly discussed elsewhere herein, lead-in content (e.g., text, still images, video images, and/or audio content) may be generated using a trained language model, wherein the lead-in content may act as a link between the claim and the third party content that provides the transition for the user.

It is understood that although the foregoing discussion may refer to using claims-based content generation for certain example purposes (e.g., for third party content, user interests, product recommendation, etc.), the disclosed systems, processes, and techniques are not limited to such example purposes, and instead may be used for any content generation purpose (e.g., where claims may be classified and/or filtered in a manner suitable and relevant for a given purpose and where such classified or filtered claims may be used to generate relevant content using a model, such as an LLM or other deep learning model).

Certain aspects will now be described with reference to the figures.

Figure 4:
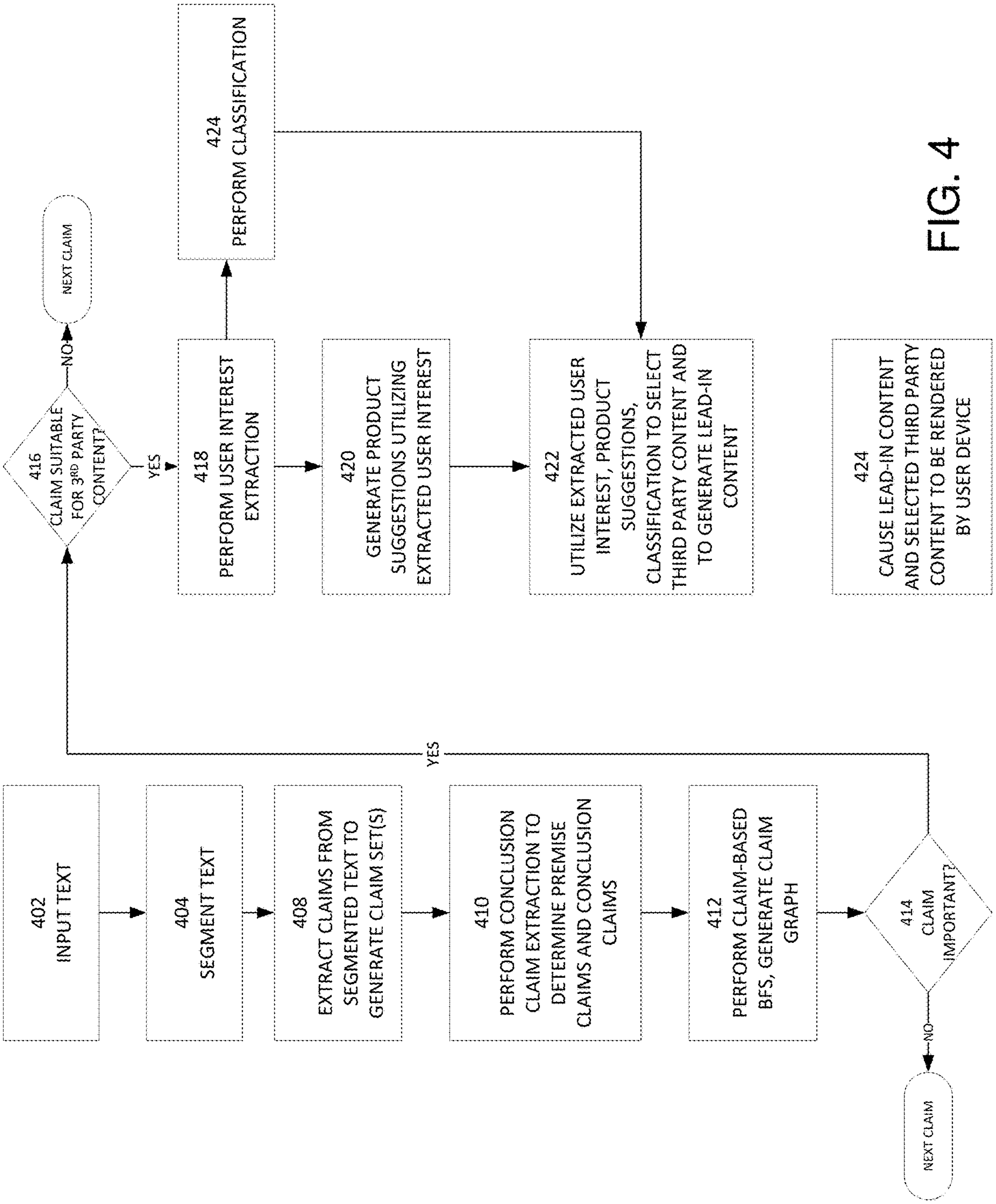
FIG. 4 illustrates an example process.

FIG. 4 illustrates an example process that performs claim extraction, claim graph construction, and the identification of claims suitable for presentation together with third party content (e.g., of a specific type). The example process may be executed using one or more of the systems and devices disclosed herein. At block 402, text is input. As discussed elsewhere herein, such text may be generated by an artificial intelligence model (e.g., a transformer neural network model or other large language model) in response to a user prompt (e.g., a query regarding an item type, travel, services, entertainment, sports, fashion, news, etc.).

At block 404, the input text may be segmented into smaller sets of text (e.g., into paragraphs, sentences, phrases, a certain number of characters or words or special dividers). Thus, the input text may be divided into segments of a predetermined length (e.g., a predetermined number of characters or tokens) or semantically (e.g., into phrases, sentences, or paragraphs) to ensure a given segment fits within a claim extraction model's input context window.

Optionally, recursive segmenting may be utilized. Optionally, agentic segmenting may be utilized, wherein a large language model (LLM), such as those disclosed herein, may be utilized to dynamically determine segment boundaries based on semantic understanding. Agentic segmenting may consider the flow of ideas and context, and its use may result in more coherent and relevant segments as compared to rule-based or fixed-size methods.

Optionally, a combination of the foregoing techniques may be utilized to perform segmenting. For example, the output from an AI model may optionally first be divided into paragraphs (e.g., utilizing recursive segmenting) and then further split into smaller segments based on semantic similarity.

A given segment may optionally partially overlap a previous segment (e.g., 1, 2, 5, 10 words, or 50, 100, 200, or 300 characters). The use of overlapping segments may ensure that important information is not lost across segment boundaries.

At block 408, claims may be extracted from the segmented text to generate one or more claim sets. Such extraction may be performed using a trained language model by leveraging the model's ability to understand and interpret natural language in a structured way. For example, for a given segment, a prompt may be configured to instruct the language model to identify and list explicit claims, such as statements that express a belief, assertion, or argument. The prompt may optionally be phrased in plain language (e.g., "Extract all factual or argumentative claims from the following text") that guides the model's output. The language model, trained on a large volume of diverse textual data, uses its understanding of semantics, syntax, and context to parse the input and isolate sentences or phrases that constitute claims.

Once the model processes segments individually, the outputs are optionally aggregated, and redundant or overlapping claims may be optionally filtered using text similarity techniques. Combining segmenting and prompt-based querying enables efficient and scalable claim extraction to be performed.

At block 410, conclusion claim extraction may be performed and premise claims and conclusion claims may be identified. The determination and labeling of premise claims and conclusion claims may be performed using one or more models trained for argument mining and/or argumentation structure parsing. For example, BERT (Bidirectional Encoder Representations from Transformers) LLM models may be utilized for sequence classification or token classification. In addition or instead, transformer-based models with Conditional Random Fields (CRFs) layers may be utilized for structured output. CRFs comprise graphical models configured to leverage the structural dependencies between outputs to better model data with an underlying graph structure. Optionally, in addition or instead, sequence-to-sequence models may be utilized for extracting argument structure.

Sentence-level and/or token premise or conclusion labeling may be utilized. For example, with respect to sentence-level classification, a given sentence may be classified as a "premise", "conclusion", or "other." Token-level labeling may be especially useful when multiple arguments are mixed in a single sentence. Premises may be linked to the conclusion they support.

At block 412, claim-based BFS is performed and used to generate a claim graph where nodes correspond to claims and directed edges encode the support relationships between them, as similarly discussed elsewhere herein. At block 414, a determination is made as to whether a given claim is sufficiently important to make further determinations regarding its suitability to be presented with corresponding third party content. An importance filter may be utilized that examines and optionally ranks the importance of the claim (e.g., using the number and types of links). For example, the importance filter may be configured to determine that claims that are close to the conclusions on the claim graph or have many (e.g., more than a threshold number) connected edges are important claims.

In particular, optionally, one or more of the following techniques may be used to identify influential "important" nodes:

The in-degree centrality of the claim may be determined wherein the number of other claims that support or reference a given claim is determined. Claims with high in-degree (e.g., more than a threshold number of other claims that support or reference the given claim) are often conclusions or central points and so may be considered and labeled as important claims.

The out-degree centrality of the claim may be determined, wherein claims that support many other claims (e.g., more than a threshold number of claims) are often foundational premises, and so may be labeled as an important claim.

The betweenness centrality of the claim may be determined, where the number of times the claim lies on the shortest path between other claims is determined. A high number of betweenness (e.g., greater than a corresponding threshold) may indicate a bridging claim or pivotal connector and so may be labeled as an important claim.

The importance of the claim may also be determined using the importance of the claims linking to it.

Optionally, a model, such as a natural language processor (NLP), may be utilized to determine the claim type and assign a corresponding label and/or weight. For example, the NLP may be utilized to determine whether a claim is a major conclusion and hence of high importance, or an intermediate conclusion and hence of moderate importance.

In addition or instead, the importance of the claims may be determined based on the abstractness of the claim, where general or high-level claims tend to be more central and hence of greater importance. In addition or instead, the importance of the claims may be determined based on the assertiveness or modality ("must", "definitely" vs. "might", "could") of the claim, where more assertive claims may be ranked as more important.

If the claim is determined to be of sufficient importance (e.g., using one or more the techniques described herein), at block 416 a determination is made as to whether the claim is suitable for a related display of third party content.

For example, certain key text (e.g., key words or phrases) may be indicative of a claim's suitability for third party content. By way of illustration, the phrase "luxurious EV" detected in a claim may be suitable for third party content (e.g., an advertisement) regarding a luxury electric vehicle, comprising video, still images, audio, text, and/or graphics depicting, describing, or otherwise related to the luxury electric vehicle. For example, such words or phrases may be compared to a database of words and topics that are indicative of suitability for third party content, and if a match is found, the claim is labeled as suitable. Optionally, a language model (e.g., an LLM) may be utilized to determine one or more concepts in the claim (e.g., range anxiety for electric vehicles), and such determined concepts may be used to determine the suitability of the claim for third party content.

At block 418, user interest is determined, optionally using a model. Optionally, topic modelling (e.g., using a probabilistic model such as LDA (Latent Dirichlet Allocation) or NMF (Non-negative Matrix Factorization)) may be utilized to determine an underlying claim topic, which in turn may be utilized in inferring a user's interest. By way of further example, pre-trained models may be utilized to classify text into interest categories such as "sports", "automotive," "travel," "fashion," "technology", "finance", etc.

At block 420, the user's interest may be classified (e.g., using custom-built ontologies, public taxonomies, and/or embedding similarity).

For example, once keywords/phrases or topics are identified, they may be matched to predefined interest taxonomies (e.g., mapping "EV"→"Vehicles"→range") using ontologies. By way of further example, public taxonomies, such as IAB categories (standard classifications used to organize and categorize web content, such as for the purpose of advertising targeting), Google Interest Categories, and/or the like may be used to perform the classification.

By way of additional example, embedding similarity may be utilized to classify keywords/phrases or topics by comparing sentence/topic embeddings to interest label embeddings using cosine similarity, or the like.

For example, if a claim asserts that "range anxiety is the primary reason people are hesitant to buy EVs," then the associated user interest pertains to long-range electric vehicles, and the process may recommend EVs equipped with extended battery capacity.

At block 422, the extracted user interest, product suggestions, and classifications are used to select content (e.g., specific third party content) to be rendered in association with the claim (e.g., immediately adjacent to the claim) and to generate lead-in content that connects the selected content with the claim.

At block 424, the process causes the user device to render the lead-in content and the selected content in association with the claim.

FIG. 1 illustrates an example environment which may be utilized with the processes and systems described herein. Although certain examples may refer to an LLM, the disclosed processes and systems may similarly be utilized with respect to other generative models, such as artificial intelligence (AI) image generators, Autoregressive Models, Bayesian Networks, Generative Adversarial Networks, Gaussian Mixture Models, Hidden Markov Models, Latent Dirichlet Allocation (LDA) models, and/or Variational Autoencoders (VAEs).

A system 104 is configured to perform claim extraction, claim graph construction, a determination as to whether a claim is suitable for being rendered in conjunction with other content (e.g., third party content, such as advertisement), and a search for such content to be rendered in conjunction with the claim. The system 104 may comprise a cloud system. With respect to the cloud-based computer system implementation, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage). Optionally, some or all of the system 104 functionality may be incorporated into a user device 110.

The system 104 may ingest vast amounts of text content and optionally image and sound content from a large variety of sources (e.g., webserver 106 or the like) including webpages, books, magazines, articles, and other publications. Such data may be used to train one or more models hosted by or accessed by the system 104 (e.g., using an unsupervised or supervised learning approach) to recognize claims and/or to generate lead-in content. The system 104 may access such content from corresponding systems over a network 102 (e.g., the Internet, an intranet, a wide area network, etc.).

Optionally, the system 104 may utilize natural language processing (NLP) to extract keywords, sentiment analysis to determine the mood, and/or semantic parsing to extract the structure of the input text to thereby determine if a claim is suitable for being rendered with other content (e.g., third party content).

Third party content may be accessed from or directly streamed from to user devices via third party content server 108.

As similarly discussed elsewhere herein, the system 104 may optionally host or access models which may be used to analyze text, such as the output of an LLM (or other generative model) to identify claims, to extract conclusion claims from the text, to extract premise claims from the text, to determine if a claim is suitable for display in conjunction with other content (e.g., third party content), to determine user interest, to classify claims, to make product suggestions, and/or to generate lead-in content (e.g., text, graphics, videos, still images, audio, etc.). The system 104 may also be configured to segment text so as to perform certain functions and processes described herein.

The system 104 may communicate with one or more end user devices 110 (e.g., a computing device, such as a smartphone, a desktop computer, a laptop computer, a tablet, a smart television, a game console, a smart watch or other wearable, and/or the like) over the network 102. For example, the system 104 may provide one or more user interfaces (e.g., in a webpage or an application) via which a user may enter prompts or queries. The prompts or queries entered (e.g., via a keyboard, voice, or otherwise) by the user into corresponding user interface fields may be transmitted from the user device 110 to the system 104. The system 104 may in turn generate response(s) to the user query/prompt that and transmit the response(s) to the user device 110, which may display and/or read out the response(s) to the user. The system 104 may transmit content (e.g., third party content from third party content server 108) or enable content (e.g., third party content) to be streamed to the user device 110 from third party content server 108 and to be rendered in association with a claim in the response as similarly described elsewhere herein.

Figure 2:
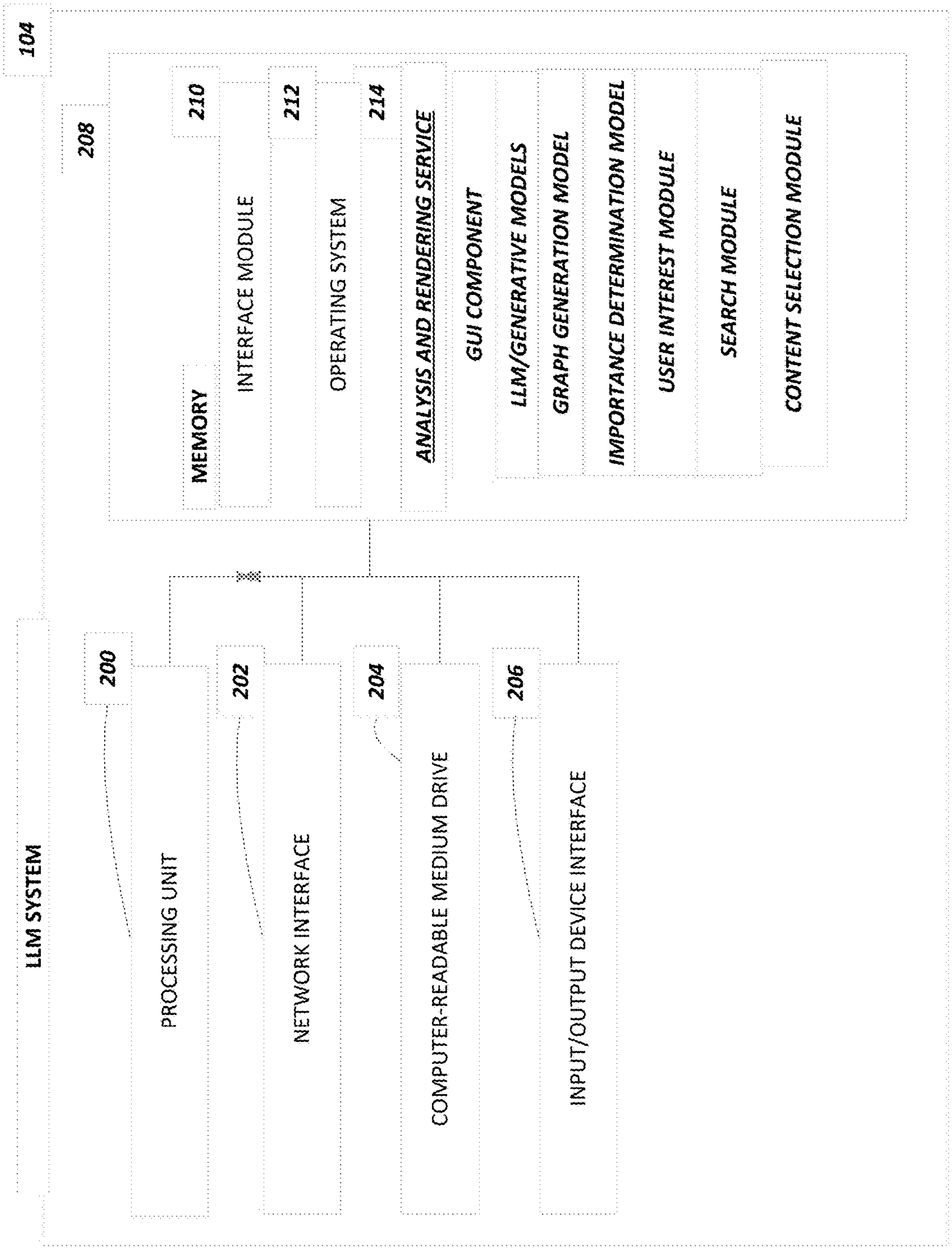
FIG. 2 illustrates and example device architecture.

FIG. 2 is a block diagram illustrating example components of the system 104. The example system 104 includes an arrangement of computer hardware and software components that may be used to implement aspects of the present disclosure. Those skilled in the art will appreciate that the example components may include more (or fewer) components than those depicted in FIG. 2. Optionally, computer hardware and/or software components illustrated in FIG. 2 may be instead or also be included in other systems depicted in FIG. 1.

The system 104 may include one or more processing units 200 (e.g., one or more general purpose processors and/or high speed graphics processors comprising one or more processor cores including arithmetic logic units, FFT processors, registers, input/output buses, and/or the like), one or more network interfaces 202, a non-transitory computer-readable medium drive 204, and an input/output device interface 206, all of which may communicate with one another by way of one or more communication buses. The network interface 202 may provide services described herein with connectivity to one or more networks or computing systems (e.g., LLM systems, webservers, search engines, user devices, etc.). The processing unit 200 may thus receive models, content, and/or information (e.g., LLM models, webpages, other content used to train the LLM models, text, catalogue data, classification data, etc.), and/or instructions from other computing devices, systems, or services via a network, and may provide responsive data and/or execute instructions. The processing unit 200 may also communicate data to and from drive 204 and further provide output information via the input/output device interface 206. The input/output device interface 206 may also accept input from one or more input devices, such as a keyboard, mouse, digital pen, touch screen, microphone, camera, etc.

The memory 208 may contain computer program instructions that the processing unit 200 may execute to implement one or more aspects of the present disclosure. The memory 208 may include RAM, ROM (and variants thereof, such as EEPROM) and/or other persistent or non-transitory tangible computer-readable storage media. An interface module 210 may provide access to data in the memory 208 and may enable data to be stored in the memory 208. The memory 208 may store an operating system 212 that provides computer program instructions for use by the processing unit 200 in the general administration and operation of an analysis and rendering service 214, including its components.

The one or more processing units 200 may comprise one or more artificial intelligence (AI) processors (which may comprise one or more graphical processing units). For example, the architecture of a given AI processing unit may be configured to accelerate the execution of machine learning and deep learning workloads, with a high degree of parallelism, memory efficiency, and dataflow optimization. An AI processor may include one or more large arrays of specialized computing units, such as tensor cores, matrix multipliers, or SIMD (Single Instruction, Multiple Data) units, which can perform large numbers (e.g., thousands) of arithmetic operations in parallel.

The one or more processing units 200 may be configured to perform matrix multiplication and convolution. Optionally, surrounding a given compute array is a hierarchical memory system, comprising high-bandwidth on-chip SRAM (e.g., scratchpad RAM), dedicated caches, and/or interfaces to off-chip memory (e.g., High Bandwidth Memory). A given AI processor may comprise a dataflow architecture and/or systolic array design, which minimizes or reduces data movement by enabling data to flow directly between processing elements in a pipeline-like fashion. Control logic and scheduling units may be utilized to coordinate the execution of instructions and manage workload distribution across the processing units. A given AI processor may incorporate circuitry for quantization, sparsity exploitation, and/or hardware-based support for specific neural network layers to further improve performance and energy efficiency.

The memory 208 may store user data (for end users), such as user credentials, user preferences (e.g., with respect to the generation of LLM responses, the provision of third party content, product recommendations, and/or the like), a history of queries, query answers, classifications (such as those disclosed herein), product information, and/or other content and data described herein.

Some or all of the data and content discussed herein may optionally be stored in a relational database, an SQL database, a NOSQL database, or other database type. Optionally, the memory 208 may include one or more external third party cloud-based storage systems.

The analysis and rendering service 214 may include a GUI component that generates graphical user interfaces and processes user inputs (e.g., LLM queries/prompts, content submissions. The analysis and rendering service 214 may also include one or more LLMs (e.g., a generative model comprising a neural network, such as an encoder-decoder recurrent neural network, optionally comprising a transfer architecture) configured to generate and/or select content to present to the user, to determine claim types, and/or other generative model functions described herein. The LLM(s) may be trained using some or all of the data described herein and/or other data.

The analysis and rendering service 214 may additionally include a graph generation module configured to construct a graph structure of claims as similarly discussed elsewhere herein, an importance determination module configured to determine the importance of a given claim as similarly discussed elsewhere herein and to determine whether a claim is suitable for an associated presentation of third party content (e.g., content of a specific type) as similarly discussed elsewhere herein, a search module configured to perform searches for content as similarly discussed elsewhere herein, and a content selection module configured to select third party content to be rendered in association with a claim and to cause the third party content to be rendered in association with the claim as similarly discussed elsewhere herein.

Optionally, one or more of the generative models described herein may comprise a transformer architecture that utilizes self-attention, which enables the model to selectively focus on different parts of the input sequence during the encoding process. The transformer architecture may comprise an encoder and a decoder, connected through a one or more multi-head attention and feedforward layers.

The encoder is configured to receive an input sequence and process it using multi-head self-attention, where the input sequence is transformed into a set of query, key, and value vectors. The query, key, and value vectors may be used to compute the attention scores between given positions in the sequence, enabling the model to identify the relevant (e.g., most relevant) portions of the input sequence for respective positions.

The decoder is configured to receive the encoder output and generate an output sequence. The decoder may also utilize multi-head attention and may be further configured with an additional attention mechanism that enables the decoder to attend to the encoder output and to generate the output sequence using the relevant information from the input sequence. For example, an attention module may repeat its computations several times in parallel, which may be referred to as respective attention heads. Optionally, the attention module splits Query, Key, and Value parameters N-ways and passes each, independently, through a separate attention head.

The transformer architecture may comprise one or more feedforward layers, which apply a linear transformation followed by a non-linear activation function to the output of the attention layers. The feedforward layers facilitate further capture patterns in the input and output sequences.

The transformer may comprise a loss function that measures the difference between the predicted output sequence and the true output sequence. The transformer is configured to minimize or reduce the loss function output. Backpropagation may be utilized as part of the minimization process, where the gradients of the loss function with respect to the model parameters are calculated and used to update the model weights (e.g., associated with neural network layers).

Figure 3A:
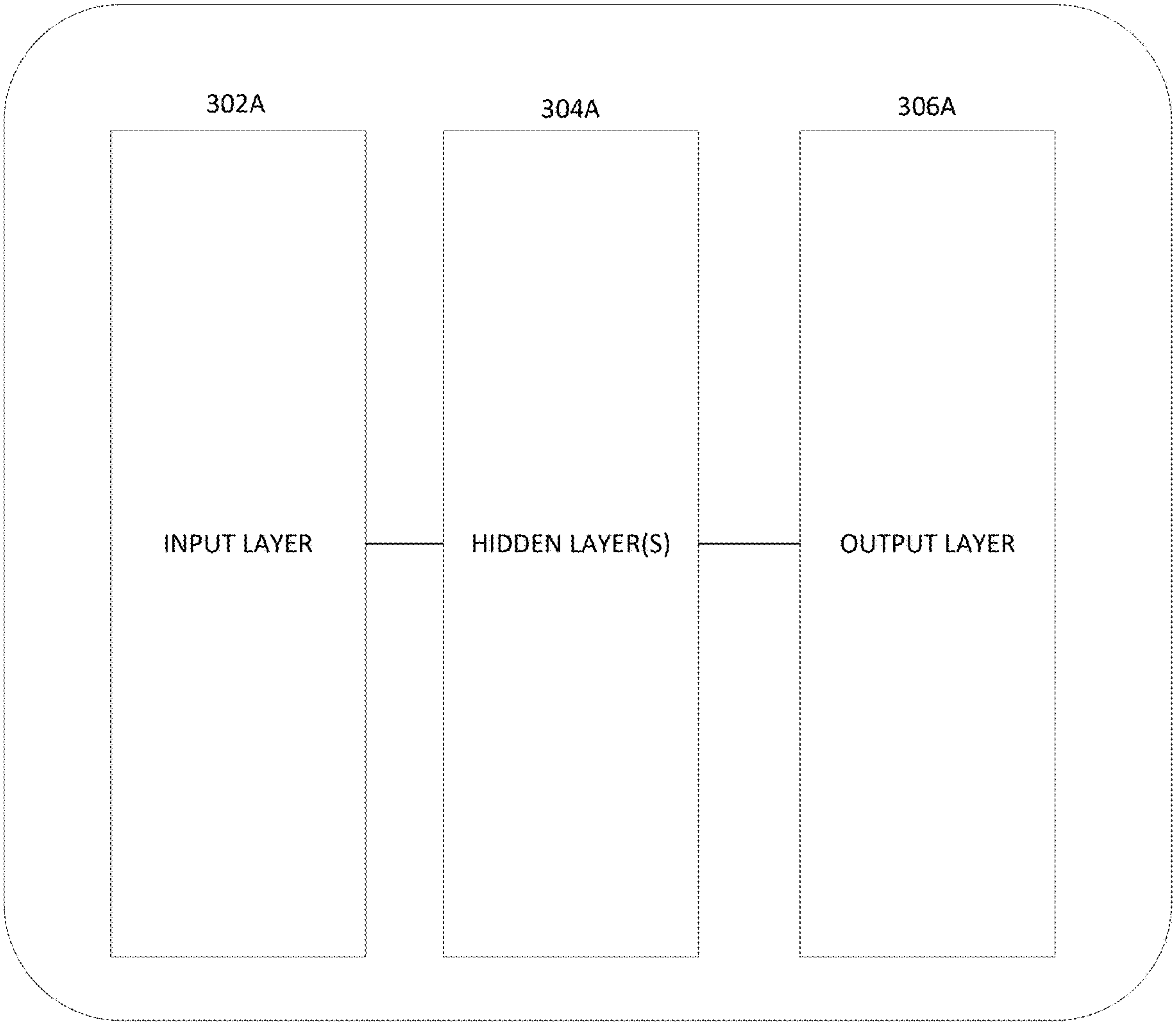
FIG. 3A illustrates an example neural network architecture.

An example of a neural network utilized by a given generative model is illustrated in FIG. 3A. The neural network may be utilized in a transformer model, such as that described herein.

The neural network may contain an input layer 302A, one or more hidden layers 304A, and an output layer 306A. The hidden layers 304A may be configured as convolutional layers, pooling layers, fully connected layers and/or normalization layers. For example, the neural network may be configured with one or more pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

The training data (e.g., text, image, or audio) may comprise data scraped from one or more websites, from one or more databases, or may be obtained from other sources.

The neural network may be trained using a supervised or unsupervised process. The neural network layer node weights may be adjusted using backpropagation based on an error function output with respect to the accuracy/relevance of the content generated and/or selected by the neural network, to thereby lower the error.

Figure 3B:
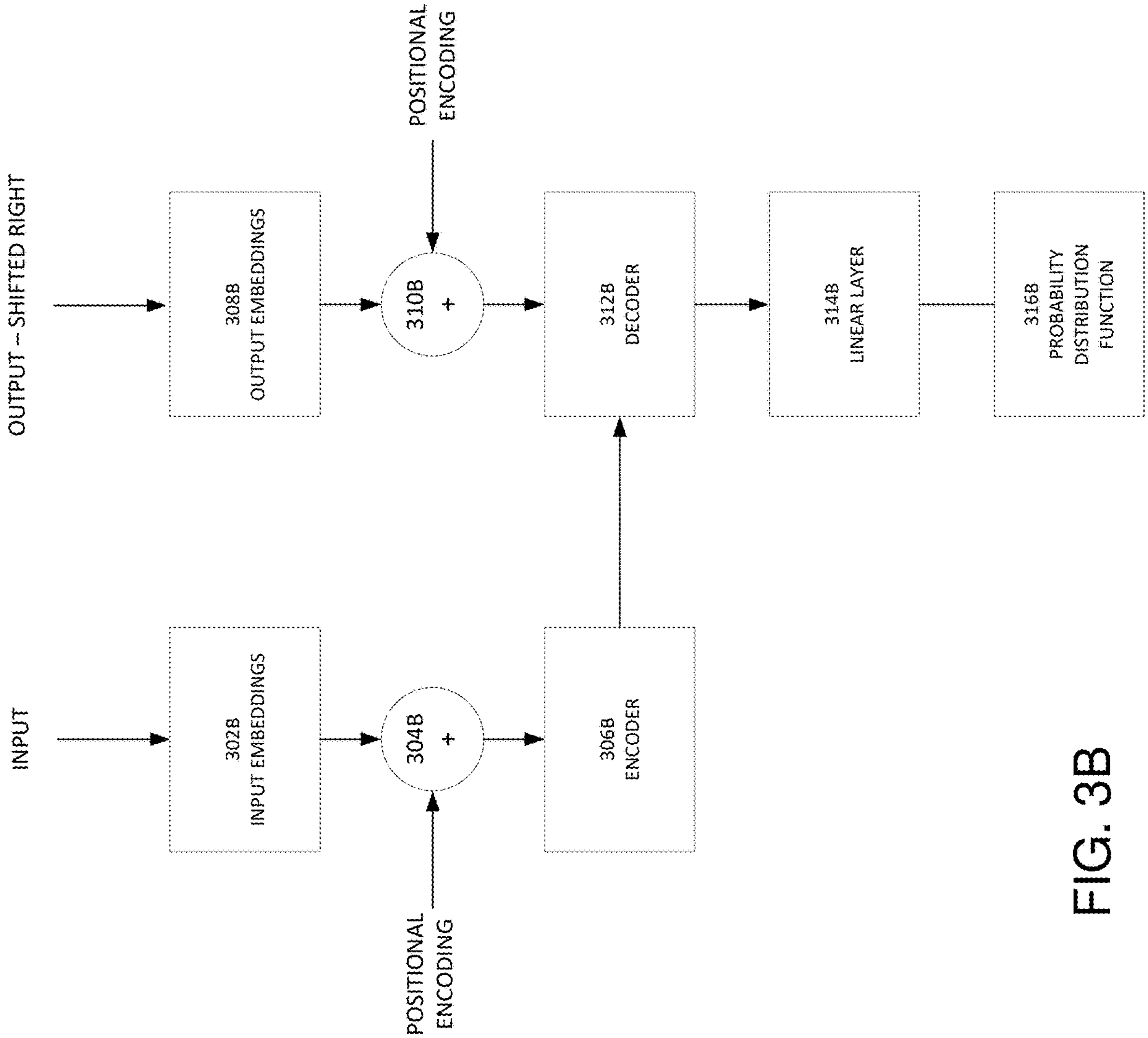
FIG. 3B illustrates an example transformer architecture.

A transformer model may be utilized to generate and/or select content for a user as part of a generative model (e.g., an LLM or other generative model) and to respond to system queries. In addition, a transformer model may be utilized to analyze the output of another generative model, such as an LLM. Referring now to FIG. 3B, an example transformer model architecture is illustrated.

Block 302B is configured to receive tokens (a sequence of characters or subwords that represent a single unit of meaning within the input text) and generate input embeddings, where the input text is converted into a numerical format, sometimes referred to as input embeddings. The input embeddings represent words as numbers so as to be suitable for machine learning model processing. During training, the model learns how to create such embeddings so that similar vectors represent words with similar meanings.

Positional encoding may be utilized to encode the position of a given word in the input sequence as a set of numbers. The set of numbers may be input to transformer model 304B, in association with the input embeddings, to enable the model to understand the order of words in a sentence and generate grammatically correct and semantically meaningful output.

A neural network encoder 306B processes the received text and generates a series of hidden states that encapsulate the text context and the text meaning and that represent the input text at different levels of abstraction. Optionally, there may be a plurality of encoder layers. Optionally, the encoder tokenizes the input text into a sequence of tokens (e.g., words or sub-words), and applies one or more serial attention layers, such as individual words or sub-words. Advantageously, such attention layers enable the transformed model to selectively focus on different parts of the input sequence rather than having to treat each word or sub-word the same way, and further advantageously, enables relationships between inputs significantly distanced apart in the sequence to be determined. Such determined relationships facilitate language processing tasks.

The decoder 312B may be trained to predict the next word in a text sequence based on the prior words. This is optionally performed in part by shifting the output sequence to the right so that the decoder is only using the earlier words.

The output is converted to a numerical format, which may be referred to as output embeddings 308B. Positional encoding is optionally performed to facilitate the transformer model understanding of the order of words in a segment (e.g., a sentence). The set of numbers may be input 310B. A loss function, configured to calculate the difference between the transformer model's predictions and the actual values, may be utilized to adjust the transformer model to improve accuracy by reducing the difference between predictions and targets, and hence the error. During training, the output embeddings may compute the loss function and update the transformer model parameters to improve the transformer model performance. During an inference process, the output embeddings may generate output text by mapping the model's predicted probabilities of a given token to the corresponding token in the vocabulary.

The decoder 312B may receive the positionally encoded input representation and the positionally encoded output embeddings and, based on the foregoing, generates an output sequence. There may be one or more layers of decoders 312B. During the training process, the decoder learns how to predict the next word by examining the prior words. The decoder 312B may generate natural language text based on the input sequence and the context learned by the encoder.

A linear layer 314B may map the output embeddings from the decoder 312B to a higher-dimensional space to thereby transform the output embeddings from the decoder 312B into the original input space. A probability distribution function, 316B, such as the softmax function, may be applied to the output of the model's final layer, producing a vector of scores representing the likelihood of each possible output token in the vocabulary given the input sequence. The function may map these scores to a probability distribution over the vocabulary, with higher scores corresponding to higher probabilities.

By converting the output of the model into a probability distribution, the probability distribution function enables the transformer model to produce a prediction for the next token that is both informed by the input sequence and consistent with the language's syntax and semantics. This allows the model to generate fluent, coherent text that reflects the structure and style of the input text.

Thus, systems and methods are disclosed that reduce computer resource utilization while efficiently performing claim extraction, claim graph construction, and a search for third party content suitable for one or more of the claims.

Methods and systems are described configured to generate and distribute content over a network and cause the content to be rendered on one or more devices. A computer system may comprise a processing device comprising one or more arrays of tensor cores, matrix multipliers, and/or SIMD (Single Instruction, Multiple Data) units.

A tensor core may be configured to accelerate matrix-matrix operations, which are utilized in deep learning workloads such as neural network training and inference, such as those described herein. A tensor core may be configured to operate on fixed-size matrices (e.g., 4×4, 8×8, 16×16, etc.). A tensor core may be configured to to perform fused multiply-accumulate (FMA) operations in a single step, wherein two input matrices may be input and multiplied, and the result may be added to an accumulator matrix, optionally in one hardware operation. The tensor cores may be configured for mixed-precision computation, multiplying low-precision inputs (e.g., FP16, bfloat16, or INT8) while accumulating in higher precision (e.g., FP32) to preserve numerical stability. A scheduler may be configured break down large matrix computations into tiles that fit the tensor core's fixed size and orchestrates their execution across multiple cores. By offloading linear algebra computations to dedicated hardware, the tensor core(s) provide large throughput improvements compared to conventional cores, making them very useful for deep learning and AI inference tasks.

The processing device may comprise a dataflow or systolic array architecture. The computer system receives and segments text. Claims may be extracted and may be determined to be conclusion or premise claims. A graph structure may be generated reflecting the relationship between the claims. A characteristic (e.g., importance) of respective claims may be determined. Using the characteristic, a determination may be made as to whether additional content is to be rendered in association with a given claim. In response to such a determination, additional content may be caused to be rendered on a device adjacent to the given claim.

An aspect of the present disclosure relates to a computer system configured to enable content rendering, the computer system comprising: one or more processing devices, including at least one processing device comprising one or more arrays of tensor cores, matrix multipliers, and/or SIMD (Single Instruction, Multiple Data) units, the one or more processing devices configured to: receive text from a first source; segment the text into segmented text; extract claims from the segmented text; extract conclusion claims from the extracted claims; extract premise claims from the extracted claims; generate a claim graph structure comprising a plurality of nodes and a plurality of edges, wherein a given node corresponds to a respective claim and a given edge encodes a support relationships between respective nodes; use the claim graph to determine a characteristic of respective claims; at least partly in response to a determined characteristic of a given claim, determine if the given claim is suitable to be displayed in conjunction with an item of content of a first type from a second source; at least partly in response to determining that the given claim is suitable to be displayed in conjunction with an item of content of a first type from a second source, perform a determination of a user interest and of a classification; use the determined user interest to determine a product recommendation; enable a first item of content of a first type from the second source to be selected based at least in part on the determined product recommendation and the classification; generate lead-in content for the selected first item of content of the first type from the second source; and enable the lead-in content to be rendered in association with the first item of content adjacent to the given claim.

Optionally, the first source comprises a generative learning model. Optionally, segmenting the text into segmented text comprises agentic segmenting. Optionally, extracting conclusion claims further comprises determining respective claim positions within the text. Optionally, extracting premise claims is performed after extracting conclusion claims. Optionally, generating a claim graph structure is performed using claim-based BFS (breadth-first search). Optionally, determining the characteristic of the given claim is based at least in part on a distance of the given claim to a conclusion claim in the claim graph and/or a number of connected edges of the given claim in the claim graph. Optionally, determining if the given claim is suitable to be displayed in conjunction with an item of content of a first type, is based at least in part on an identification of key text within the given claim. Optionally, the computer system is configured to use embedding similarity to classify the determined user interest. Optionally, the computer system configured to provide the given claim determined to be suitable for item of content of a first type from a second source, the determined user interest, and the product recommendation to a search engine, wherein the selection of the first item of content is based at least in part on a corresponding search result generated by the search engine.

An aspect of the present disclosure relates to a computer implemented method, the method comprising: inputting text from a first source; segmenting, using a computer system comprising one or more processing devices, the text into segmented text; extracting, using the computer system, claims from the segmented text; extracting, using the computer system, conclusion claims from the extracted claims; extracting, using the computer system, premise claims from the extracted claims; generating, using the computer system, a claim graph structure comprising a plurality of nodes and a plurality of edges, wherein a given node corresponds to a respective claim and a given edge encodes a support relationships between respective nodes; based at least in part on the claim graph, determining, using the computer system, a characteristic of respective claims; at least partly in response to a determined characteristic of a given claim, determining, using the computer system, if the given claim is suitable to be displayed in conjunction with an item content of a first type; at least partly in response to determining that the given claim is suitable to be displayed in conjunction with an item of content of a first type, performing a determination of a user interest and of a classification; using the determined user interest to determine a product recommendation; enabling, using the computer system, a first item of content to be selected based at least in part on the determined product recommendation and the classification; and enabling, using the computer system, the first item of content to be rendered in association with the given claim.

Optionally, the one or more processing devices include at least one processing device comprising one or more arrays of tensor cores, matrix multipliers, and/or SIMD (Single Instruction, Multiple Data) units. Optionally, the first source comprises a generative learning model. Optionally, segmenting the text into segmented text comprises agentic segmenting. Optionally, extracting conclusion claims further comprises determining respective claim positions within the text. Optionally, extracting premise claims is performed after extracting conclusion claims. Optionally, generating a claim graph structure is performed using claim-based BFS (breadth-first search). Optionally, determining the characteristic of the given claim is based at least in part on a distance of the given claim to a conclusion claim in the claim graph and/or a number of connected edges of the given claim in the claim graph. Optionally, determining if the given claim is suitable to be displayed in conjunction with an item content of a first type, is based at least in part on an identification of key text within the given claim. Optionally, the method further comprises using embedding similarity to classify the determined user interest. Optionally, the method further comprises providing the given claim determined to be suitable to be displayed in conjunction with an item content of a first type, the determined user interest, and the product recommendation to a search engine, wherein the selection of the first item of content is based at least in part on a corresponding search result generated by the search engine.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources, or may comprise a standalone system. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone or mobile application, computer application, a short messaging service message (e.g., SMS, MMS, etc.), instant messaging, email, push notification, audibly, via haptic feedback, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, microphone, camera, touch pad, etc.), network interfaces, etc.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer system configured to enable content rendering, the computer system comprising:

one or more processing devices, including at least one processing device comprising one or more arrays of tensor cores, matrix multipliers, and/or SIMD (Single Instruction, Multiple Data) units, the one or more processing devices configured to:

receive text from a first source;

segment the text into segmented text;

extract claims from the segmented text;

extract conclusion claims from the extracted claims;

extract premise claims from the extracted claims;

generate a claim graph structure comprising a plurality of nodes and a plurality of edges, wherein a given node corresponds to a respective claim, and a given edge encodes a support relationship between respective nodes;

use the claim graph to determine a characteristic of respective claims;

use a determined characteristic of a given claim to determine if the given claim is suitable to be displayed in conjunction with an item of content of a first type from a second source;

based on the determination that the given claim is suitable to be displayed in conjunction with an item of content of a first type from a second source, perform a determination of a user interest and of a classification;

use the determined user interest to determine a product recommendation;

generate a claim embedding vector corresponding to the given claim and a plurality of product embedding vectors corresponding to a plurality of products;

compute similarity scores between the claim embedding vector and the plurality of product embedding vectors using a similarity metric;

apply a similarity threshold to discard, by deletion from memory or overwriting, product embedding vectors having similarity scores that fail to satisfy the similarity threshold;

enable a first item of content of the first type from the second source to be selected using the determined product recommendation, the classification, and the similarity scores remaining after applying the similarity threshold;

generate lead-in content for the selected first item of content of the first type from the second source; and enable the lead-in content to be rendered in association with the first item of content adjacent to the given claim.

2. The computer system of claim 1, wherein the first source comprises a generative learning model.

3. The computer system of claim 1, wherein segmenting the text into segmented text comprises agentic segmenting.

4. The computer system of claim 1, wherein extracting conclusion claims further comprises determining respective claim positions within the text.

5. The computer system of claim 1, wherein extracting premise claims is performed after extracting conclusion claims.

6. The computer system of claim 1, wherein generating a claim graph structure is performed using claim-based BFS (breadth-first search).

7. The computer system of claim 1, wherein determining the characteristic of the given claim is based at least in part on a distance of the given claim to a conclusion claim in the claim graph and/or a number of connected edges of the given claim in the claim graph.

8. The computer system of claim 1, wherein determining if the given claim is suitable to be displayed in conjunction with an item of content of a first type, is based at least in part on an identification of key text within the given claim.

9. The computer system of claim 1, wherein the computer system is configured to use embedding similarity to classify the determined user interest.

10. The computer system of claim 1, the computer system configured to provide the given claim determined to be suitable for an item of content of a first type from a second source, the determined user interest, and the product recommendation to a search engine, wherein the selection of the first item of content is based at least in part on a corresponding search result generated by the search engine.

11. A computer implemented method, the method comprising:

inputting text from a first source;

segmenting, using a computer system comprising one or more processing devices, the text into segmented text;

extracting, using the computer system, claims from the segmented text;

extracting, using the computer system, conclusion claims from the extracted claims;

extracting, using the computer system, premise claims from the extracted claims;

generating, using the computer system, a claim graph structure comprising a plurality of nodes and a plurality of edges, wherein a given node corresponds to a respective claim and a given edge encodes a relationship between respective nodes;

based at least in part on the claim graph, determining, using the computer system, a characteristic of respective claims;

using a determined characteristic of a given claim, determining, using the computer system, if the given claim is suitable to be displayed in conjunction with an item of content of a first type;

using the determination that the given claim is suitable to be displayed in conjunction with an item of content of a first type, performing a determination of a user interest and of a classification;

using the determined user interest to determine a product recommendation;

generating a claim embedding vector corresponding to the given claim and a plurality of product embedding vectors corresponding to a plurality of products;

computing similarity scores between the claim embedding vector and the plurality of product embedding vectors using a similarity metric;

applying a similarity threshold to discard, by deletion from memory or overwriting, product embedding vectors having similarity scores that fail to satisfy the similarity threshold;

enabling, using the computer system, a first item of content to be selected based at least in part on the determined product recommendation, the classification, and the similarity scores remaining after applying the similarity threshold; and enabling, using the computer system, the first item of content to be rendered in association with the given claim.

12. The computer implemented method of claim 11, wherein the one or more processing devices include at least one processing device comprising one or more arrays of tensor cores, matrix multipliers, and/or SIMD (Single Instruction, Multiple Data) units.

13. The computer implemented method of claim 11, wherein the first source comprises a generative learning model.

14. The computer implemented method of claim 11, wherein segmenting the text into segmented text comprises agentic segmenting.

15. The computer implemented method of claim 11, wherein extracting conclusion claims further comprises determining respective claim positions within the text.

16. The computer implemented method of claim 11, wherein extracting premise claims is performed after extracting conclusion claims.

17. The computer implemented method of claim 11, wherein generating a claim graph structure is performed using claim-based BFS (breadth-first search).

18. The computer implemented method of claim 11, wherein determining the characteristic of the given claim is based at least in part on a distance of the given claim to a conclusion claim in the claim graph and/or a number of connected edges of the given claim in the claim graph.

19. The computer implemented method of claim 11, wherein determining if the given claim is suitable to be displayed in conjunction with an item of content of a first type, is based at least in part on an identification of key text within the given claim.

20. The computer implemented method of claim 11, the method further comprising using embedding similarity to classify the determined user interest.

21. The computer implemented method of claim 11, the method further comprising providing the given claim determined to be suitable to be displayed in conjunction with an item of content of a first type, the determined user interest, and the product recommendation to a search engine, wherein the selection of the first item of content is based at least in part on a corresponding search result generated by the search engine.

* * * * *